United States Patent [19]

Sano et al.

[11] Patent Number: 4,996,011

[45] Date of Patent: Feb. 26, 1991

[54] PRODUCTION OF POLYETHYLENE MATERIALS HAVING IMPROVED STRENGTH AND MODULUS QUALITIES

[75] Inventors: Akira Sano, Kawasaki; Hirofumi Kamiishi, Yokohama; Kazuo Matsuura, Tokyo, all of Japan

[73] Assignee: Nippon Oil Co., Ltd., Tokyo, Japan

[21] Appl. No.: 374,981

[22] Filed: Jul. 3, 1989

[30] Foreign Application Priority Data

Jul. 9, 1988 [JP] Japan .................................. 63-171195

[51] Int. Cl.⁵ .............................................. B29C 35/02
[52] U.S. Cl. .................................... 264/28; 526/348.1; 526/352; 526/66; 526/124; 526/125; 264/120; 264/122; 264/126; 264/171; 264/205; 264/210.2; 264/210.6; 264/210.8; 264/211; 264/236; 264/300; 264/320; 264/331.17; 525/240
[58] Field of Search ............... 264/210.2, 320, 122, 264/126, 120, 288.4, 171, 210.8, 300, 331.17, 205, 211, 210.6, 236, 210.3, 28; 525/73, 240, 348.1, 352

[56] References Cited

U.S. PATENT DOCUMENTS

| | | | |
|---|---|---|---|
| 3,944,536 | 3/1976 | Lupton | 264/331.17 |
| 4,518,552 | 5/1985 | Matsuo et al. | 264/126 |
| 4,769,433 | 9/1988 | Chanzy | 264/290.5 |
| 4,820,466 | 4/1989 | Zachariades | 264/120 |
| 4,824,619 | 4/1989 | Okada et al. | 264/288.4 |
| 4,879,076 | 11/1989 | Sano et al. | 264/331.17 |

FOREIGN PATENT DOCUMENTS

| | | |
|---|---|---|
| 49-106581 | 10/1974 | Japan . |
| 50-23864 | 8/1975 | Japan . |
| 50-39470 | 12/1975 | Japan . |
| 51-152 | 1/1976 | Japan . |
| 51-153 | 1/1976 | Japan . |
| 51-3514 | 2/1976 | Japan . |
| 52-11710 | 4/1977 | Japan . |
| 52-15111 | 4/1977 | Japan . |
| 54-12953 | 5/1979 | Japan . |
| 54-12954 | 5/1979 | Japan . |
| 56-15408 | 2/1981 | Japan . |
| 56-47407 | 4/1981 | Japan . |
| 56-95909 | 8/1981 | Japan . |
| 57-79009 | 5/1982 | Japan . |
| 57-187305 | 11/1982 | Japan . |
| 58-21405 | 2/1983 | Japan . |
| 59-187614 | 10/1984 | Japan . |
| 59-227420 | 12/1984 | Japan .................................. 264/211 |
| 60-15120 | 1/1985 | Japan . |
| 60-97836 | 5/1985 | Japan . |
| 60-198220 | 10/1985 | Japan .................................. 264/211 |
| 63-41512 | 2/1988 | Japan . |
| 63-66207 | 3/1988 | Japan . |
| 63-159408 | 7/1988 | Japan . |

OTHER PUBLICATIONS

T. Kanamoto et al., Preprints of the Society of High Polymers, Japan, vol 34, p. 873 (1985).

*Primary Examiner*—Jeffery Thurlow
*Attorney, Agent, or Firm*—Finnegan, Henderson, Farabow, Garrett & Dunner

[57] ABSTRACT

A process for producing polyethylene materials in which ultrahigh molecular polyethylene is molded by compression, extrusion or rolling and stretching in a solid phase and at specified temperatures. The polymer is formed by a selected multi-stage polymerization with the use of a composite catalyst of specified compositions. Fibers or films are obtained with improved strength and modulus qualities.

15 Claims, No Drawings

PRODUCTION OF POLYETHYLENE MATERIALS HAVING IMPROVED STRENGTH AND MODULUS QUALITIESBACKGROUND OF THE INVENTION

1. Field of the Invention

This invention relates to a process for the production of polyethylene materials having improved mechanical strength and elastic modulus characteristics.

2. Description of the Prior Art

An ethylene polymer of an extremely high molecular weight greater than about one million is known as ultrahigh molecular weight polyethylene hereinafter referred to simply as "UHMW polyethylene". This type of polyethylene enjoys high credit as an engineering plastics for its superior resistance to impact and to abrasion and also for its peculiar self lubrication. The polymeric material finds extensive application to hoppers, silos, gears, linings and the like for use in various sectors of industry ranging from food processing, civil engineering, chemistry, agriculture and mining to backings for skiing plates and the like for use in sports and leisure supplies.

UHMW polyethylene is by nature high in melting viscosity. This leaves the problem that the polymer can not suit extrusion or orientation under usual molding conditions.

To form highly strong, elastic fibers from UHMW polyethylene, a certain gel is allowed to stretch which is obtained from a decalin dope of that polymer as disclosed in Japanese Patent Laid-Open Publication No. 56-15408. However, this dope can only be effected with limited polymer concentrations, say 3% by weight of a polyethylene having a weight-average molecular weight of $1.5 \times 10^6$ and 1% by weight of a polyethylene having a similar molecular weight of $4 \times 10^6$. Such prior stretching is undesirable for practical purposes as dope preparation requires much solvent and even meticulous care in dissolving the polymer in the solvent, entailing less economy and inconvenient handling.

Alternatively, it has been proposed that UHMW polyethylene be oriented at temperatures lower than its melting point by extrusion, stretching or rolling as disclosed for instance in Japanese Patent Laid-Open Publication No. 59-187614, No. 60-15120 and No. 60-97836 and Preprints of the Society of High Polymers, Japan, vol. 34, p. 873 (1985). In these known modes of molding, a dilute solution of the polymer in xylene, decalin, kerosine or the like is cooled or isothermally crystallized to form a single crystal mat which is thereafter extruded or stretched in a solid phase. This is not economically feasible with much solvent necessary for mat formation.

It is also known that UHMW polyethylene can be extruded or stretched as produced In the case where the polymer is derived from a one-stage reaction in common use, high pressure extrusion is necessarily employed at low speeds and at small draw ratios with the results that the molded product is involved in inadequate strength and modulus qualities.

With the foregoing difficulties of the prior art in view, the present inventors have previously developed a method of compressing UHMW polyethylene in particulate form at temperatures below its melting point, followed by extrusion or rolling at a solid phase and by subsequent stretching, which method constitutes the subject matter of Japanese Patent Laid-Open Publication No. 63-41512 and No 63-66207. A process for producing this type of polyethylene has also been found by the inventors, the process being comprised of two stages of reaction in which a ultrahigh molecular polymer is formed in the first stage and a low molecular polymer in the second stage as taught by Japanese Patent Laid-Open Publication No. 63-159408.

Compression is generally preferred at low pressure from the commercial point of view Known particulate polyethylenes of a UHMW type when subjected to low pressure compression have been found to invite insufficient particle-to-particle contact and thus result, upon extrusion or rolling and subsequent stretching, in a molded material of inadequate mechanical properties.

SUMMARY OF THE INVENTION

It has now been found that polyethylene materials of enhanced strength and modulus characteristics are attributed to the use of a selected mode of molding of UHMW polyethylene particles which are obtained by a selected polymerization reaction with a selected catalyst. The present invention is therefore directed to the provision of a new process for producing polyethylene materials in which UHMW polyethylene is allowed to mold as produced, without dissolution or melting, at high speed and at low pressure and with less power, thereby forming mechanically strong polyethylene materials with utmost efficiency and great economy.

The process according to the invention may be applied for instance to the production of fibers, films and sheets from UHMW polyethylene.

More specifically, according to the invention, there is provided a process for producing polyethylene materials of high mechanical strength and great elastic modulus, which comprises compressing particulate polyethylene of a ultrahigh molecular weight at a temperature lower than a melting point thereof, followed by extrusion or rolling at a solid phase, and subsequently stretching the resulting molded shape, the particulate polyethylene having an intrinsic viscosity of 5 to 50 dl/g at 135° C. in decalin and resulting from at least the following two stages of polymerization:

(a) a first stage wherein ethylene is polymerized in a reactor with the use of a composite catalyst comprising a solid catalyst component containing magnesium, titanium and/or vanadium and an organometallic compound and in the presence of hydrogen, thereby forming from 0.1 to 15 parts by weight of a polymer having an intrinsic viscosity of 0.1 to 2 dl/g at 135° C. in decalin; and (b) a second stage wherein a fresh feed of ethylene is introduced into the same reactor and polymerized in the presence of hydrogen at a lower concentration than in the first stage or in the absence of hydrogen, thereby forming from 85 to 99.9 parts by weight of a polymer having an intrinsic viscosity of 8 to 50 dl/g at 135° C. in decalin.

DETAILED DESCRIPTION OF THE INVENTION

According to the present invention, UHMW polyethylene in particulate form may be produced by polymerizing ethylene in the presence of a selected catalyst of a specified composition. The catalyst is essentially comprised of an inorganic solid catalyst component and an organometallic compound. Contained in the catalyst component are magnesium, titanium and/or vanadium, which component is usually obtained by carrying a titanium compound on an inorganic magnesium-containing compound in conventional manner.

Suitable examples of magnesium compounds include magnesium, magnesium hydroxide, magnesium carbonate, magnesium oxide, magnesium chloride and the like, double salts, mixed oxides, carbonates, chlorides and hydroxides each containing both a metal selected from silicon, aluminum and calcium and a magnesium atom, and those inorganic compounds derived by treatment with or by reaction with one member of the following materials, i.e. with water, organic oxygen-containing compounds such as alcohols, phenols, ketones, aldehydes, carboxylic acids and their esters, polysiloxanes and their acid amides and the like, inorganic oxygen-containing compounds such as alkoxides and oxyacid salts of metals and the like, organic sulfur-containing compounds such as thiols, thioethers and the like, inorganic sulfur-containing compounds such as sulfur dioxide, sulfur trioxide, sulfur and the like, monocyclic or polycyclic aromatic hydrocarbons such as benzene, toluene, xylene, anthrathene, phenanthrene and the like, or halogen-containing compounds such as chlorine, hydrogen chloride, metallic chlorides, organic halides and the like.

Eligible titanium compounds include for example titanium derivatives such as halides, alkoxy halides, alkoxides, halogen oxides and the like. Tetravalent and trivalent titanium compounds are preferred.

Tetravalent titanium compounds are those represented by the formula $$Ti(OR)_n X_{4-n}$$

where R is an alkyl group of 1 to 20 carbon atoms or an aryl or aralkyl group, X is a halogen atom, and n is $0 \leq n \leq 4$.

Specific examples include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, tributoxymonochlorotitanium, tetrabutoxytitanium, monopentoxytrichlorotitanium, monophenoxytrichlorotitanium, diphenoxydichlorotitanium, triphenoxymonochlorotitanium, tetraphenoxytitanium and the like.

Trivalent titanium compounds are those derived by reducing titanium tetrahalides such as titanium tetrachloride and titanium tetrabromide with hydrogen, aluminum, titanium or organometallic compounds of Groups I to III metals of the Periodic Table, or by reducing tetravalent alkoxytitanium halides of the formula $$Ti(OR)_m X_{4-m}$$

where R is an alkyl group of 1 to 20 carbon atoms or an aryl or aralkyl group, X is a halogen atom, and m is $0<m<4$, with organometallic compounds of Groups I to III metals.

Tetravalent titanium compounds are particularly preferred for use in the catalyst component according to the invention.

Suitable vanadium compounds include for example tetravalent vanadium compounds such as vanadium tetrachloride and the like, pentavalent vanadium compounds such as vanadium oxytrichloride, o-alkyl vanadate and the like, and trivalent vanadium compounds such as vanadium trichloride and the like.

Various other solid catalyst components may conveniently be used which are disclosed for instance in Japanese Patent Publication No. 51-3514, No. 50-23864, No. 51-152, No. 52-15111, No. 52-11710 and No. 51-153 and Japanese Patent Laid-Open Publication No. 49-106581 and No. 56-95909. Further, modified catalyst components include a reaction product of a Grignard compound and a titanium compound as disclosed for instance in Japanese Patent Publication No. 50-39470, No. 54-12953 and No. 54-12954 and Japanese Patent Laid-Open Publication No. 57-79009, and an inorganic oxide combined with an organic carboxylate as disclosed for instance in Japanese Patent Laid-Open Publication No. 56-47407, No. 57-187305 and No. 58-21405.

Organometallic compounds used herein are compounds represented by the formulae $R_3Al$
$R_2AlX$
$RAlX_2$
$R_2AlOR$
$RAl(OR)X$ and
$R_3Al_2X_3$ where R is an alkyl group of 1 to 20 carbon atoms or an aryl or aralkyl group, R being the same or different, and X is a halogen atom.

Specific examples include triethylaluminum, triisopropylaluminum, triisobutylaluminum, trihexylaluminum, trioctylaluminum, diethylaluminum chloride, diethylaluminum ethoxide, ethylaluminum sesquichloride and mixtures thereof.

The amount of the organometallic compound to be used is not specifically restrictive which however may be feasible in the range of 0.1 to 1,000 times per mol of titanium compound.

In accordance with the invention, polymerization may be effected with the use of a multi-stage reaction including at least the following two stages.

The first stage produces a polyethylene in an amount of 0.1 to 15 parts by weight, preferably 0.2 to 10 parts, more preferably 0.5 to 7 parts. The polymer has an intrinsic viscosity of 0.1 to 2 dl/g at 135° C. in decalin, preferably 0.5 to 1.8 dl/g, more preferably 0.8 to 1.5 dl/g. Ethylene may be polymerized in a reactor in a solvent or in a gas phase and in the presence of hydrogen in the range of 40 to about 95% by mol per mol of monomer, preferably 50 to 90%, more preferably 60 to 80%, and with the addition of the above specified catalyst Reaction conditions are at a pressure of 0 to 70 kg/cm²G and at a temperature lower than the melting point of the final polymer, say 20° to 110° C., preferably 40° to 100° C., more preferably 60° to 90° C.

Solvents useful for the polymerization are organic solvents inert to Ziegler type catalysts. They may be selected for example from saturated hydrocarbons such as butane, pentane, hexane, heptane, octane, cyclohexane and the like, and aromatic hydrocarbons such as benzene, toluene, xylene and the like. High-boiling solvents such as decalin, tetralin, decane, kerosine and the like may also be employed to meet a particular mode of molding.

In the first stage polymer smaller intrinsic viscosities than 0.1 dl/g would render the final composite polyethylene moldable by low pressure compression but only in an extent to cause quality deterioration of the stretched article. Larger viscosities than 2.0 dl/g would lead to inadequate compression at low pressure.

The second stage involves forming a polyethylene in an amount of 85 to 99.9 parts by weight, preferably 90 to 99.8 parts, more preferably 93 to 99.5 parts. The polymer has an intrinsic viscosity of 8 to 50 dl/g at 135° C. in decalin, preferably 10 to 40 dl/g, more preferably 12 to 30 dl/g. A fresh feed of ethylene may be polymerized in the same reactor in the absence or presence of hydrogen up to 10% by mol per mol of monomer, preferably less than 5%. Reaction conditions are at a pressure of 0 to 70 kg/cm$^2$G and at a temperature of $-20°$ to $+110°$ C., preferably 0° to 90° C., more preferably 20° to 80° C. The catalyst may if necessary be replenished.

The second stage polymer should not depart from the above intrinsic viscosity range. Lower viscosities than 8 dl/g would result in a stretched material of mechanical weakness, whereas higher viscosities than 50 dl/g would make the composite polyethylene less moldable by compression, and hence subsequent extrusion, rolling and stretching at a solid phase.

UHMW polyethylene eligible for the purpose of the invention is obtainable by strict observance of the polymer fractions between the two stages. The second or ultrahigh molecular polymer if less than 85 parts, hence more than 15 parts of the first or low molecular polymer, would produce a mechanically weak polyethylene material, meaning that the low molecular polymer needs tedious removal as with solvent extraction. More second polymer than 99.9 parts, hence less than 0.1 part of the first polymer would not be effective for low pressure compression.

The first stage polymer may be formed, where desired, as a copolymer of ethylene with any other suitable α-olefin selected from propylene, butene-1, 4-methylpentene-1, hexene-1, octene-1 or the like, all of which can be activated by Ziegler catalysts in common use. The comonomer may be used in a small amount of 0.1 to 5 % by mol. Too high a comonomer content should be avoided to preclude molecular weight reduction of the resulting copolymer. It has now been found that a more stable polymerization reaction can be attained by contacting an ethylene monomer and a comonomer with the catalyst system according to the invention prior to initiation of the reaction.

In addition to the above two stages, there may be employed an extra stage or stages in which polymer components of higher or lower molecular weights are added to provide a wide range of UHMW polyethylene products.

The composite polymer resulting from the polymerization reaction of the invention has an intrinsic viscosity in the range of 5 to 50 dl/g at 135° C. in decalin, preferably 8 to 40 dl/g, more preferably 10 to 30 dl/g. These viscosity ranges correspond in terms of the viscosity-average molecular weights to from five hundred thousand to twelve million (500,000 to 12,000,000), from nine hundred thousand to nine million (900,000 to 9,000,000) and from one million two hundred thousand to six million (1,200,000 to 6,000,000), respectively.

Lower viscosities than 5 dl/g would give a polyethylene material of poor mechanical strength. Polymers exceeding 50 dl/g would fail to undergo compression and hence subsequent extrusion, rolling and stretching.

Although the exact reasoning is not fully known for the peculiar compression moldability of the UHMW polyethylene of the invention, it is believed that the particulate polymer has a multiplex structure consisting of an outer phase predominantly of a lower molecular polymer component. On exposure to forces at a temperature above 100° C. but below its melting point, the low molecular particles will presumably move readily toward one another and thus get intimately contacted, contributing to adequate compression at low pressure usually at 10 MPa. Importantly, UHMW polyethylene according to the invention should be obtained by initially producing a polyethylene of a lower molecular weight, followed by formation of a ultrahigh molecular weight polyethylene. Reversal of this sequence leads to a polyethylene of insufficient compression moldability at low pressure.

Polyethylene materials contemplated under the invention may be produced by compressing UHMW polyethylene particles at reduced pressure, followed by solid phase extrusion or rolling, and subsequently by subjecting the resulting material to stretching.

Compression is accomplished prior to extrusion or rolling. No particular limitation is imposed upon the method of compressing particulate polyethylene. In the case of extrusion being subsequently effected, the particles may be put into a solid phase extruder equipped with a cylinder and then compressed to give a rod-like article. Molding conditions are at a temperature below the melting point of the polymer, preferably not lower than 100° C., more preferably higher than 120° C., and over a wide range of pressures. Lower pressures are preferred taking power consumption in view, usually less than 10 MPa, preferably from 0.1 to 5 MPa, more preferably from 0.5 to 2 MPa. When coextrusion is desired, polyethylene and a different type of polymer may be pressed together into a sheet of 0.1 to 2 mm in thickness at a temperature lower than their respective melting points and at a similar pressure. In the case of rolling to be pursued, particulate polyethylene may be compressed by any suitable known method into a film or sheet in which instance pressing conditions are preferred as in coextrusion.

Solid phase extrusion may be effected for example on an extruder provided with a cylinder and a die. After being placed in the cylinder, the compressed material is extruded at above 20° C., preferably higher than 90° C., both temperatures being necessarily lower than the melting point of the starting polymer. The extrusion ratio varies with the molecular weight and composition of polymers and the type of catalysts, but depends optionally on the diameter of dies. The ratio ranges usually from 2 to 100, preferably 3 to 50, more preferably 3 to 25, as the extruder to die ratio in terms of their cross-sectional areas.

Rolling may be carried out under those temperature conditions stated in connection with extrusion. One mode of rolling involves passing particulate polyethylene, at a solid phase without melting, through a pair of rolls rotating at varying peripheral speeds to thereby form a sheet or film. The deformation ratio may be generally over a wide range, but usually at a rolling efficiency in the range of 1.2 to 30, preferably 1.5 to 20, as the length ratio after and before rolling. Rolling may be suitable choice be of a single- or multi-pass type.

Tensile stretching may be done by nip stretching or roll stretching at from 20° to 150° C., preferably 20° to 140° C. The stretching speed depends on the molecular weight and composition of polymers, ranging usually from 1 to 100 mm/min, preferably 5 to 50 mm/min. Nip stretching is particularly preferred.

The larger the draw ratio, the higher strength and the greater modulus. UHMW polyethylene according to the invention is highly stretchable in a draw ratio of 20 to 60.

Polyethylene materials such as fibers and films embodying the process of the invention have an elastic tensile modulus greater than 120 GPa and a mechanical tensile strength higher than 2 GPa.

EXAMPLES

The present invention will now be described by way of the following examples which are provided for illustrative purposes and should not be construed as limiting to the invention. In these examples, all viscosities are intrinsic viscosities [η] as measured at 135° C. in decalin and all parts by weight unless otherwise noted.

EXAMPLE 1

(a) Preparation of Solid Catalyst Component

Ten (10) g of commercially available magnesium chloride anhydride and 1.7 g of aluminum triethoxide were put into a 400-ml stainless steel pot in which 25 stainless steel balls each ½ inch in diameter were accommodated. The mixture was milled in a nitrogen atmosphere at room temperature for 5 hours, followed by addition of 2.2 g of titanium tetrachloride. Ball milling was continued for further 16 hours, after which there was obtained a solid catalyst component having a per gram titanium content of 39 mg.

(b) Polymerization

A 2-liter stainless steel autoclave equipped with an induction stirrer was purged with nitrogen and charged with 1,000 ml of hexane, 1 mmol of triethylaluminum and 10 mg of the catalyst component provided in (a) above. The mixture was heated with stirring to 90° C. and the system raised to 1.9 kg/cm$^2$G with hexane vapor pressure. Hydrogen was charged to a total pressure of 8.4 kg/cm$^2$G and then ethylene to a total pressure of 10 kg/cm$^2$G, and polymerization was initiated. The ratio of H$_2$ to C$_2$H$_4$ plus H$_2$ was 0.8. Ethylene was successively fed from a 5-liter monomer metering tank to maintain the system at 10 kg/cm$^2$G. The first stage reaction was completed when the pressure in the tank was decreased to 0.5 kg/cm$^2$, thereby giving a polymer with a viscosity of 0.1 dl/g.

Unreacted ethylene was quickly purged and the temperature lowered to 70° C., followed by charge of fresh ethylene to a total pressure of 10 kg cm$^2$G. Polymerization was resumed with successive feed of the monomer at 10 kg/cm$^2$G. Reaction was continued until the tank pressure was reduced to 9.5 kg/cm$^2$, whereby the second stage reaction was completed. There was formed a polymer having a viscosity of 16.0 dl/g.

The resulting polymeric slurry was taken into a beaker, followed by hexane removal in vacuo, providing 62 g of white polyethylene. The amount of polymer was 5 parts in the first stage and 95 parts in the second stage. The viscosity of the composite polymer was 13.5 dl/g.

(c) Production of Polyethylene Material

Particulate polyethylene obtained in (b) above was pressed at 130° C. and at 0.5 MPa into a 1.0 mm thick sheet which was then passed at 138° C. through a pair of rolls each dimensioned to be 100 mm in diameter and 500 mm in crosswise length and counterrotating at an identical speed. There was provided a film drawn at a ratio of 6.

The rolled film was further stretched on a tensile tester equipped with a temperature-constant chamber and at a temperature of 135° C. and at a crosshead speed of 50 mm/min There was obtained a film drawn at a ratio of 25. Strength and modulus were examined in the manner accepted in the art and with the results tabulated.

Example 2

The procedure of Example 1(b) was followed except that the pressure drops in the ethylene tank were changed to 0.2 kg/cm$^2$ and 9.8 kg/cm$^2$, respectively, in the first and second stages, after which 63 g of white polyethylene was obtained. The polymer was composed of 2 parts in the first stage and 98 parts in the second stage and showed a viscosity of 14.5 dl/g.

Polyethylene thus formed was examined for moldability under the conditions of Example 1(c) and with the results tabulated.

Example 3

About 10 g of the polymer provided in Example 1(b) was put in an Instron capillary rheometer partly modified and mounted with a cylinder of 9.525 mm in inside diameter and also with a 10 mm long die of 3.9 mm in inside diameter, followed by compression for 10 minutes at 130° C. and at 2 MPa and by subsequent extrusion at 130° C. and at 2 MPa and by subsequent extrusion at 130° C. and at 0.6 mm/min. Extrusion could possibly be made at a draw ratio of 6.

The extrudate was stretched on a tensile tester at 135° C. and at a crosshead speed of 50 mm/min and with the results tabulated. Molding was possible at a draw ratio of 23.

Example 4

(a) Preparation of Solid Catalyst Component

The procedure of Example 1(a) was followed except that 2.2 g of aluminum triethoxide was used in combination with 3.2 g of silicon tetraethoxide. Contained in the finished catalyst component was 32 mg of titanium per gram.

(b) Polymerization

An autoclave as used in Example 1(b) was charged with 1,000 ml of hexane, 2 mmol of diethylaluminum chloride and 10 mg of the catalyst component prepared above. The mixture was heated with stirring to 80° C. and the system raised to 1.8 kg/cm$^2$G with hexane vapor pressure Polymerization was initiated with hydrogen charged to a total pressure of 8.4 kg/cm$^2$G and then ethylene to a total pressure of 10 kg/cm$^2$G (mol ratio of H$^2$ to C$^2$H$^4$+H$^2$=0.8). Ethylene feed was continued from a monomer tank to maintain the system at 10 kg/cm$^2$G. Reaction was continued until the pressure in the tank was reduced to 0.5 kg/cm$^2$ (first stage). There was formed a polymer showing a viscosity of 1.2 dl/g.

The reactor was quickly purged of unreacted ethylene, and the system was adjusted in its temperature to 60° C. Fresh ethylene was charged to a total pressure of 10 kg/cm$^2$G. Polymerization was resumed with successive ethylene feed to a total pressure of 10 kg/cm$^2$G and continued until the tank pressure was reduced to 9.5 kg/cm² (second stage), thereby giving a polyethylene having a viscosity of 21 dl/g.

The polymeric slurry was put into a beaker, followed by vacuum evaporation of hexane, to provide 62 g of white polyethylene. The polymer was composed of 5 parts in the first stage and 95 parts in the second stage, whose viscosity was 18.0 dl/g.

Molding was done on compression at 130° C. and at 0.5 MPa and subsequently on rolling at 138° C. and at 4 in draw ratio and on tensile stretching at 135° C. There was obtained a molded material drawn at a ratio of 26 and the properties tabulated.

Example 5

(a) Preparation of Solid Catalyst Component

The procedure of Example 1(a) was followed except that 2.0 g of titanium tetrachloride was used in combination with 0.5 g of triethoxyvanadium oxide. The resulting catalyst component had a per gram vanadium content of 7.6 mg and a per gram titanium content of 30.6 mg.

(b) Polymerization

An autoclave similar to that used in Example 1(b) was charged with 1,000 ml of hexane, 1 mmol of triethylaluminum and 10 mg of the catalyst component prepared above. The mixture was heated with stirring to 90° C. and the pressure in the system raised to 2.0 kg/cm²G with hexane vapor pressure. Polymerization was initiated with hydrogen fed to a total pressure of 7.6 kg/cm²G and then ethylene to a total pressure of 10 kg/cm²G. Ethylene was successively introduced from a monomer tank to maintain the system at 10 kg/cm²G (mol ratio of $H_2$ to $C_2H_4+H_2=0.7$). Reaction was continued until the tank pressure was reduced to 0.5 kg/cm² (first stage), thereby giving a polyethylene with a viscosity of 1.1 dl/g.

The autoclave was quickly purged of unreacted ethylene and the temperature adjusted at 70° C. Polymerization was resumed with fresh ethylene charged to a total pressure of 10 kg cm²G and with ethylene fed successively from a monomer tank. Reaction was continued until the tank pressure was decreased to 9.5 kg/cm² (second stage). There was formed a polyethylene with a viscosity of 17.5 dl/g.

The polymeric slurry was poured into a beaker, and hexane was removed in vacuo to provide 60 g of white polyethylene composed of 5 parts in the first stage and 95 parts in the second stage and having a viscosity of 15.0 dl/g.

The polymer so obtained was examined for moldability on compression at 130° C. and at 0.5 MPa, rolling at 130° C. and at 6 in draw ratio and tensile stretching at 135° C. and at 21 in draw ratio and with the results tabulated.

Comparative Example 1

An autoclave as used in Example 1(b) was charged with 1,000 ml of hexane, 1 mmol of triethylaluminum and 10 mg of the catalyst component prepared in Example 1(a). The mixture was heated with stirring to 80° C. and the system raised to 1.7 kg/cm²G with hexane vapor pressure. Polymerization was initiated with ethylene charged to a total pressure of 10 kg/cm²G, the monomer being successively fed to maintain the system at such total pressure. Reaction was continued for 20 minutes, after which there was obtained 72 g of white polyethylene having a viscosity of 13.4 dl/g.

The polymer was examined for moldability under the conditions of Example 1(c) and with the results tabulated. Molding could be made at low a draw ratio of 12.

Comparative Example 2

A reactive mixture as formulated in Comparative Example 1 was heated with stirring to 70° C. The system was raised to 1.6 kg/cm²G with hexane vapor pressure. Polymerization was initiated with ethylene charged to a total pressure of 10 kg/cm²G, which total pressure was maintained by successive feed of the monomer from a 5-liter tank. Reaction was continued until the tank pressure was reduced to 9.5 kg/cm² (first stage), whereby a polymer was formed with a viscosity of 16.2 dl/g.

Unreacted ethylene was quickly purged, and the system was elevated in its temperature to 90° C. Hydrogen was charged to a total pressure of 8.4 kg/cm²G and thereafter ethylene to a total pressure of 10 kg/cm²G. Polymerization was resumed with the monomer successively fed from the tank (mol ratio of $H_2$ to $C_2H_4+H_2=0.8$). Reaction was continued until the tank pressure was decreased to 0.5 kg/cm² (second stage).

The polymeric slurry was treated as in Example 1(b) to provide 64 g of white polyethylene composed of 95 parts in the first stage and 5 parts in the second stage and having a viscosity of 13.7 dl/g.

Moldability was evaluated as was in Example 1(c) with the results tabulated. Tensile stretching was possible but at low a draw ratio of 13.

Comparative Example 3

The procedure of Comparative Example 2 was followed except that the catalyst component of Example 4(a) was substituted for the counterpart of Example 1(a), and the reaction temperatures at the first and second stages were changed to 60° C. and 80° C., respectively, in place of 70° C. and 90° C. There was obtained white polyethylene showing a viscosity of 18.2 dl/g.

The resulting polymer was molded as was in Example 1(c) with the results tabulated. Stretching was as low as 10 in draw ratio.

As appears clear from the tabulated data, the polyethylenes according to the invention have proved highly stretchable and hence mechanically strong and elastic. The controls failed to improve stretchability which departed from the specified reaction conditions.

TABLE

| run | first stage | | | | second stage | | | |
|---|---|---|---|---|---|---|---|---|
| | temp. °C. | $H_2/C_2H_4 + H_2$ mol ratio | $[\eta]$ dl/g | formation amount (wt. pt.) | temp. °C. | $H_2/C_2H_4 + H_2$ mol ratio | $[\eta]$ dl/g | formation amount (wt. pt.) |
| Inventive Example 1 | 90 | 0.8 | 1.0 | 5 | 70 | 0 | 16.0 | 95 |
| Inventive Example 2 | 90 | 0.8 | 1.0 | 2 | 70 | 0 | 16.0 | 98 |

TABLE-continued

| run | | | | | | | | |
|---|---|---|---|---|---|---|---|---|
| Inventive Example 3 | 90 | 0.8 | 1.0 | 5 | 70 | 0 | 16.0 | 95 |
| Inventive Example 4 | 80 | 0.8 | 1.2 | 5 | 60 | 0 | 21.0 | 95 |
| Inventive Example 5 | 90 | 0.7 | 1.1 | 5 | 70 | 0 | 17.5 | 95 |
| Comparative Example 1 | 80 | 0 | 13.4 | 100 | — | — | — | — |
| Comparative Example 2 | 70 | 0 | 16.2 | 95 | 90 | 0.8 | 1.0 | 5 |
| Comparative Example 3 | 60 | 0 | 21.0 | 95 | 80 | 0.8 | 1.2 | 5 |

| run | final [η] dl/g | rool or extrusion ratio | tensile strength ratio | total draw ratio | tensile modulus GPa | tensile strength GPa |
|---|---|---|---|---|---|---|
| Inventive Example 1 | 13.5 | 6 | 25 | 150 | 130 | 3.2 |
| Inventive Example 2 | 14.5 | 6 | 22 | 132 | 124 | 3.1 |
| Inventive Example 3 | 13.5 | 6 | 23 | 138 | 125 | 3.1 |
| Inventive Example 4 | 18.0 | 4 | 26 | 108 | 120 | 3.5 |
| Inventive Example 5 | 15.0 | 6 | 21 | 126 | 121 | 3.0 |
| Comparative Example 1 | 13.4 | 6 | 12 | 72 | 90 | 2.8 |
| Comparative Example 2 | 13.7 | 6 | 13 | 78 | 95 | 2.5 |
| Comparative Example 3 | 18.2 | 6 | 10 | 60 | 84 | 3.0 |

We claim:

1. A process for producing polyethylene materials of high mechanical strength and high elastic modulus, which comprises compressing particulate polyethylene of ultrahigh molecular weight at a temperature lower than the melting point thereof, extruding or rolling the compressed polyethylene while in a solid phase to form a molded product, and subsequently stretching the molded product, said particulate polyethylene having an intrinsic viscosity of from 5 to 50 dl/g at 135° C. in decalin and being prepared by a reaction process that includes at least the following two stages of polymerization:

(a) a first stage wherein ethylene is polymerized in a reactor in the presence of a composite catalyst comprising a solid component containing magnesium and titanium or magnesium and vanadium and an organometallic compound and in the presence of hydrogen, to form from 0.1 to 15 parts by weight of an ethylene polymer having an intrinsic viscosity of from 0.1 to 2 dl/g at 135° C. in decalin; and (b) a second stage wherein fresh ethylene is polymerized in the same reactor containing the catalyst and in the presence of hydrogen at a concentration of from 0 to one lower than in the first stage to form from 85 to 95.9 parts by weight of an ethylene polymer having an intrinsic viscosity of from 8 to 50 dl/g at 135° C. in decalin.

2. The process of claim 1, wherein the particulate polyethylene is compressed at a temperature higher than 100° C. and at a pressure of not more than 10 MPa.

3. The process of claim 1, wherein the compressed polyethylene is extruded at a temperature higher than 20° C. and at an extrusion ratio of from 2 to 100.

4. The process of claim 1, wherein the compressed polyethylene is rolled at a temperature higher than 20° C. and at a rolling efficiency of from 1.2 to 30.

5. The process of claim 1, wherein the molded product is stretched at a temperature of from 20° to 150° C. and at a speed of from 1 to 100 mm/minute.

6. The process of claim 1, wherein the polyethylene material has a mechanical tensile strength higher than 2 GPa and an elastic tensile modulus greater than 120 GPa.

7. The process of claim 6, wherein the polyethylene material is in the form of a fiber, film or sheet.

8. The process of claim 1, wherein the first stage produces a polyethylene polymer in an amount of form 0.5 to 7 parts.

9. The process of claim 1, wherein the second stage produces a polyethylene polymer in an amount of from 93 to 99.5 parts.

10. The process of claim 1, wherein the polymer of the first stage has an intrinsic viscosity of 0.8 to 1.5 dl/g.

11. The process of claim 1, wherein the polymer of the second stage has an intrinsic viscosity of 12 to 30 dl/g.

12. The process of claim 1, wherein the ethylene is polymerized in the first stage at a pressure of from 0 to 70 Kg/cm$^2$G and at a temperature of from 20° to 110° C. and in the second stage at a pressure of from 0 to 70 Kg/cm$^2$G and at a temperature of from −20 ° to 110° C.

13. The process of claim 1, wherein the intrinsic viscosity of the particulate polyethylene is from 10 to 30 dl/g.

14. The process of claim 1, wherein the hydrogen is present in the first stage in the range of from 40 to about 95% by mol per mol of ethylene and in the second stage in the range of from 0 to 10% by mol per mol of monomer.

15. The process of claim 14, wherein the hydrogen present in the first stage is from 60 to 80% and in the second stage from 0 to 5%.

* * * * *

UNITED STATES PATENT AND TRADEMARK OFFICE
CERTIFICATE OF CORRECTION

PATENT NO. : 4,996,011
DATED : February 26, 1991
INVENTOR(S) : Akira Sano et al

It is certified that error appears in the above-identified patent and that said Letters Patent is hereby corrected as shown below:

Column 11, line 56, Claim 1, change "95.9" to --99.9--.

Signed and Sealed this

Sixth Day of October, 1992

Attest:

DOUGLAS B. COMER

*Attesting Officer*        Acting Commissioner of Patents and Trademarks